United States Patent [19]

Garde et al.

[11] 3,838,448

[45] Sept. 24, 1974

[54] COMPENSATED BASELINE CIRCUIT

[75] Inventors: Lawrence Garde, Minneapolis; Rolland R. Ritter, St. Paul, both of Minn.

[73] Assignee: Control Data Corporation, Minneapolis, Minn.

[22] Filed: Feb. 7, 1973

[21] Appl. No.: 330,370

[52] U.S. Cl. .................................................. 360/45

[51] Int. Cl. ............................................ G11b 5/44

[58] Field of Search ....................................... 360/45

[56] References Cited

UNITED STATES PATENTS

| | | | |
|---|---|---|---|
| 3,516,066 | 6/1970 | Jacoby | 340/174.1 H |
| 3,537,084 | 10/1970 | Behr | 340/174.1 H |
| 3,597,751 | 8/1971 | Heldecker et al. | 340/174.1 H |
| 3,622,894 | 11/1971 | Heldecker et al. | 340/174.1 H |
| 3,699,554 | 10/1972 | Jones | 340/174.1 H |
| 3,719,934 | 3/1973 | Behr et al. | 340/174.1 H |
| 3,736,582 | 5/1973 | Norris | 340/174.1 H |

*Primary Examiner*—Vincent P. Canney
*Attorney, Agent, or Firm*—Edward L. Schwarz

[57] ABSTRACT

Apparatus and method for decreasing decoding errors in data encoding of the type where the relative time of occurrence of successive peaks determines the data content, and the errors result from peak shift caused by pulse crowding. In a preferred embodiment, the data signal is differentiated and delayed, and a baseline signal generator provides a compensated baseline signal having a value equal to the arithmetic mean of the immediately adjacent positive and negative signal peaks of the differentiated data signal, and the decoded signal has a first value after the delayed differentiated data signal crosses the compensated baseline in a positive direction and a second value after the compensated baseline signal is crossed by the delayed differentiated data signal in the opposite direction.

44 Claims, 9 Drawing Figures

PATENTED SEP 24 1974

3,838,448

SHEET 3 OF 4

COMPENSATED BASELINE CIRCUIT

FIELD OF THE INVENTION

This invention deals with the decoding of data encoded in the double frequency, phase, or modified frequency modulation method when high data rates or densities are involved. These encoding methods differ from others in that the *time* the data signal changes state determines the value of the data, rather than the relative signal magnitude. These encoding methods are frequently used to transmit data over telephone lines, and in data transcription on magnetic tapes, drums, and discs. It has been found that such data signals, although encoded with pulses having nearly vertical leading and trailing edges, when being decoded (i.e., read or received) have more gradually rising and falling leading and trailing edges. When sufficiently close together, the trailing edge of the previous pulse or the leading edge of the succeeding pulse may extend past the time of the pulse peak under consideration. (Throughout this description, the term "peak" will be used to denote both relative maxima and relative minima of particular signal waveforms under discussion.) When this happens, the time of occurrence of the peak will be shifted toward either the preceeding or succeeding pulse, depending on which pulse's edge is overlapping the peak. Excellent descriptions and drawings of this peak shift phenomena are present in U.S. Pat. Nos. 3,623,041 (MacDougall) and 3,537,084 (Behr).

DESCRIPTION OF THE PRIOR ART

One class of solutions to this problem has entailed compensating the signal at the time the data is written or encoded. E.g., when it is known that a particular peak will be shifted in a particular direction, it may be written earlier or later in an effort to compensate for the shift which analysis of the signal and decoding apparatus predicts will occur. This solution is unsatisfactory since the other pulse adjacent the one being compensated will also cause peak shift in the other direction. Thus, using this technique it is almost impossible to avoid peak shift. Only the direction in which it occurs can be controlled. U.S. Pat. No. 3,503,059 (Ambriso) discloses another method of correcting pulse shift. This technique employs minor distortion in the magnetic flux at the time the data is written, so that upon readback the peaks will occur at the proper time. This is an effective solution, but is limited by the reluctance in the magnetic head, which places an upper bound on the density at which the data may be written. At high densities, the head cannot follow the minor transition quickly enough to accurately compensate the data while being written. U.S. Pat. No. 3,573,770 (Norris) employs the same technique, but different means, in avoiding peak shift.

MacDougall, supra, uses a different approach which is quite successful as well. He has devised a new system of encoding which has fewer signal transitions. Fewer signal transitions means fewer pulses, and therefore, less pulse crowding for similar data rates or densities. However, his solution does not increase the number of transitions possible per unit time, and hence is not an *electronic* solution to the problem. Behr, supra, employs the only technique known to the inventor in which the readback is compensated. Again, knowing where peak shift is likely, the strobe pulse picking out the occurrence of each peak is delayed or accelerated as needed. Behr also uses a technique employing a "transverse filter" comprising capacitors and inductors to shift the various peaks forward or backward to compensate for the shift. Other patents of interest in this area are U.S. Pat. No. 3,581,215 (Meyer), No. 3,623,040 (Erickson et al.) and No. 3,020,526 (Ridler et al.).

SUMMARY OF THE INVENTION

In decoding or digitizing data of the type under discussion, the usual procedure is to first differentiate the signal. Differentiation produces a signal which reaches zero as each peak occurs. This is a simple law of the differential calculus. As every beginning calculus student soon discovers, the differential represents the slope of the function, the slope being zero at each peak of the function, positive or negative. Thus, the problem resolves itself into detecting each crossing of zero volts by the differentiated data signal (DDS). Many well known circuits are available which will generate the differential of an input signal.

If peak shift has occurred, zero-crossing shift will occur as well. In our invention, we do not use the zero baseline in determining crossover times of the DDS. Instead, a variable baseline signal is employed, having a value dependent on characteristics other than the zero crossing point, of the DDS. In a preferred embodiment, the baseline signal value during a DDS transition from a peak of one polarity to the immediately following peak of opposite polarity is equal to the algebraic mean of these two peaks.

Preferred apparatus which computes this compensated baseline signal comprises a positive peak recorder and a negative peak recorder. Each receives the DDS and records the voltage of each positive peak as it occurs in the case of the positive peak recorder, and each negative peak voltage in the case of the negative peak recorder. The output voltages of these peak recorders are electrically averaged. The compensated baseline signal, or more briefly the CBS, is the algebraic mean of these voltages. This algebraic mean is used as the crossover voltage for the DDS transition between these two peaks. Accordingly, the DDS must be delayed by a time span sufficient to cause the transition of the delayed DDS between peaks to cross the CBS after the later of the two peaks forming the end points of the signal transition has occurred. It can be shown that if this time span is short enough to catch the DDS crossing of the CBS occurring closest to the peak immediately preceding it, all slower transitions will be detected as well.

A preferred circuit for digitizing the DDS in such a manner uses a pair of capacitors to store the DDS peak voltages, one being charged to the voltage of each positive peak and the other being charged to the voltages of the negative peaks. Diodes prevent premature discharge of the capacitors after a peak is stored. The voltages of the two capacitors are averaged by a pair of identical resistors in series connection between the two capacitor terminals at which these voltage peak values are available. These resistors must be of large enough resistance to prevent significant discharge of either capacitor until use of the voltage on each is over. The algebraic mean of the two peaks is available at the connection point between the two resistors. A delay circuit receives the DDS and delays it a time slightly less than the longest time which can elapse, for the particular DDS involved, between successive peaks of opposite polarity. This time is selected to permit these two successive peaks to be recorded and their algebraic mean computed, before the delayed DDS transition between them has crossed their mean. The delayed signal and the algebraic mean of the two recorded peaks are compared by a comparator that produces a "low" output, i.e., a Boolean 0, if the delayed signal is less than the algebraic mean of the peaks, and a "high" output (a Boolean 1) when the voltage of the delayed DDS exceeds the algebraic mean of the two recorded peaks. The reason for the prescribed delay time is now apparent. If the delay time is too short, the delayed signal will have already crossed the eventual algebraic mean value before that value has actually been reached. Therefore, the detected crossing time will not occur correctly in relation to previous crossing times. Actually, the delay need be no longer than one-half the minimum time span between successive peaks of opposite polarity plus the maximum time deviation caused by the changing CBS. This deviation can be determined by analysis of the particular DDS being digitized.

It is necessary, after the delayed DDS has crossed the compensated baseline, that the earlier recorded peak be replaced by the next peak of the same polarity (toward which the undelayed DDS will now be moving). For this purpose, circuitry is provided to discharge the capacitor sufficiently to permit storage of each new peak on it. At least three alternative ways are used to discharge this capacitor. The simplest is to use a pair of discharge resistors, each connecting the peak-storing terminal of the capacitor to ground, and constantly discharging the capacitor according to the well known laws of capacitor discharge. The size of the capacitor must be chosen so the rate is not so rapid as to seriously distort the computed average, nor should it be so slow as to prevent discharge of the capacitors to at least as low as the smallest peak possible in the DDS. Arrangement is made for the delayed DDS to provide the voltage to which the capacitor storing the peak earlier in time is charged, and the undelayed DDS the voltage of the later peak, i.e., the peak reached by the delayed DDS after it crosses the CBS.

More elaborate apparatus employs, for discharging each capcitor, a one-shot and a switch. The conduction terminals of the switch are connected so as to discharge the capacitor when the switch is closed. The one-shot supplies a closure pulse signal to the switch control terminal which causes the switch to close for the time constant of the one-shot. Each one-shot is designed to provide the pulse when a predetermined change in the digitized signal occurs. The change causing discharge of the positive-peak-storing capacitor is the comparator output change from high to low, and the change discharging the negative-peak-storing capacitor is the comparator change from low to high. Yet another embodiment is also possible, which provides the most precise control of the discharging of each capacitor. A discharge switch for each capacitor is provided, as before. Second and third comparators are used, each comparing the voltage on its associated capacitor with the DDS voltage. Each switch is controlled by a J - K flip-flop. The flip-flop for the positive peak starts capacitor discharge when the digitized output changes from high to low and stops discharge when the positive-peak-storing capacitor voltage becomes more positive than the DDS. Similarly, for the negative-peak-storing capacitor, the flip-flop causes discharge when the digitized output changes from low to high and stops discharge when the DDS becomes more negative than the voltage on the negative-peak-storing capacitor. While most elaborate of the three discharge methods discussed, this last one is the most accurate in that it directly tests to insure that the capacitors are discharged to below the peak, negative or positive, to be next recorded. It is more convenient as well, in that it is not dependent on transition time between peaks and therefore need not be adjusted or specifically designed for a particular DDS.

In the preferred embodiment, the DDS does not charge the capacitors. A constant current source having a voltage greater than the greatest positive peak is connected to the anode of the diode through which the positive-peak-storing-capacitor is charged. The DDS is placed on this diode anode and controls the charging of the capacitor by regulating the voltage at the anode of the diode. A similar charging circuit is provided for the negative-peak-storing-capacitor.

No matter what kind of peak storing and discharge apparatus is employed, it has been found necessary to utilize amplifiers with unity voltage gain at various points throughout the circuit, to provide sufficient current for proper operation of the comparators, and for proper charging of the capcitors. Accordingly, these amplifiers are used to supply the DDS to the capacitors, to supply the compensated baseline to the comparator, and after the delay circuit to supply the delayed DDS to the comparator.

The disclosed embodiment computes each successive value of the CBS as the mean of the two peaks. Specific applications may require deviations from this mean value. These deviations can be made dependent on the DDS peak values and/or time measured from some convenient datum.

This invention has wide applicability to all data encoding methods in which the time interval between signal transitions determines the data content. Accordingly, this invention can be advantageously used on all kinds of magnetic media serially transcribing data. It is also usable on long distance transmission lines where similar data encoding techniques are used. Accordingly, one purpose of this invention is to increase the speed at which data transmissions may occur.

A second purpose is to decrease data errors in transcribed or transmitted data.

BRIEF DESCRIPTION OF THE DRAWINGS

FIGS. 3*a* through 5*b* display operational embodiments of the invention, and waveforms of signals associated with them and of assistance in understanding them.

DESCRIPTION OF THE PREFERRED EMBODIMENTS

Figure 1A:
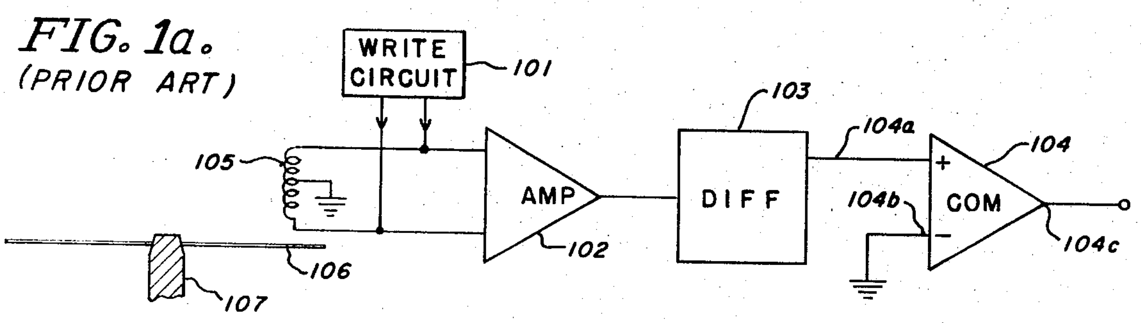
FIG. 1a. (PRIOR ART)
FIG. 1*a* displays the prior art.

FIG. 1*a* discloses the prior art as comprising disc 106 rotatably mounted on spindle 107. Read/write coil 105 is positioned adjacent the moving disc surface and receives write signals from write circuit 101 and supplies readback data signals to read amplifier 102. Read amplifier 102 provides an amplified data signal to differentiator circuit 103, which computes the differential of the voltage output of read amplifier 102. This differentiated data signal (DDS) is supplied to plus terminal 104*a* of comparator 104. The output of differentiator 103 is compared to a 0 volt input represented by grounded minus input 104*b* of comparator 104. Comparator 104 is a standard electronic circuit which provides a "low", or Boolean 0 output at terminal 104*c* when the voltage at the "minus" terminal 104*b* is more positive than that at "plus" terminal 104*a*. Output terminal 104*c* supplies a "high" signal, or Boolean 1, when the voltage at minus terminal 104*b* is more negative than that at plus terminal 104*a*.

Figure 1B:
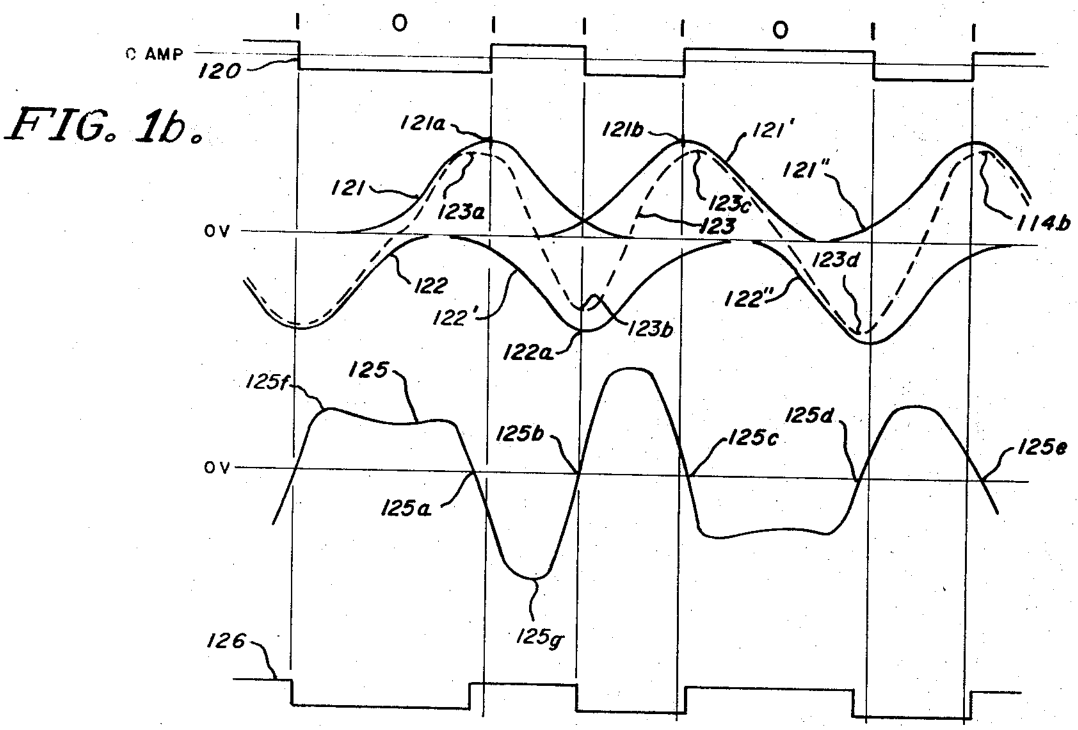
FIG. 1*b* displays the readback signals associated with the apparatus of FIG. 1*a*.

In operation, disc 106 is rotated at a constant speed. When it is desired to store data on disc 106, write circuit 101 is energized and passes a varying current representing the data through read/write coil 105. Coil 105 is placed so near the moving surface of disc 106 that it places successive magnetic states on the magnetic material covering the surface of disc 106. A typical write current signal is displayed as waveform 120 of FIG. 1*b*. On readback, the movement of the magnetized areas on disc 106 past coil 105 induces a small current in coil 105. Corresponding to each negative change in the original write current, the readback voltage displays a negative pulse 122 of FIG. 1*b*. At the point on disc 106 adjacent coil 105 that write current increased, a positive pulse 121 occurs. Differentiator circuit 103 receives the amplified voltage of the readback signal and, following the rules of elementary calculus, produces a differentiated data signal reaching zero at the peak of each readback pulse. Comparator 104 detects each crossing of the zero volt line by the differentiated signal and changes its output signal on terminal 104*c*. This indirect method of detecting signal peaks is preferred because of the difficulty inherent in detecting the precise moment of occurrence of a signal peak by conventional circuit means.

Pulses 121 and 122 may overlap if successive write current changes are sufficiently close together. It can be shown that the effect of this on the readback signal is to cause the positive and negative pulses to superimpose themselves on each other. I.e, the voltage of two pulses, parts of which are concurrent, will add together algebraically, and produce a composite signal 123. If write current transitions are sufficiently close together, leading and trailing edges of pulses may overlap the peaks of the adjacent pulses of opposite polarity. Thus, negative pulse 122' overlaps the peaks of pulses 121 and 121'. When this occurs, the peaks of composite pulse 123 will not coincide timewise with the peaks of the positive pulses corresponding to them. Thus, peak 123*a* is earlier in time than peak 121*a*, and peak 123*c* is later than peak 121*b*. Waveform 125 displays the voltage of a differential signal of such a peak-shifted composite readback signal. As can be seen, zero-crossings 125*a*, 125*b*, etc. are often significantly shifted, causing the transition times of the digitized output from comparator 104, shown as waveform 126, to be different from those of write current waveform 120.

Figure 2:
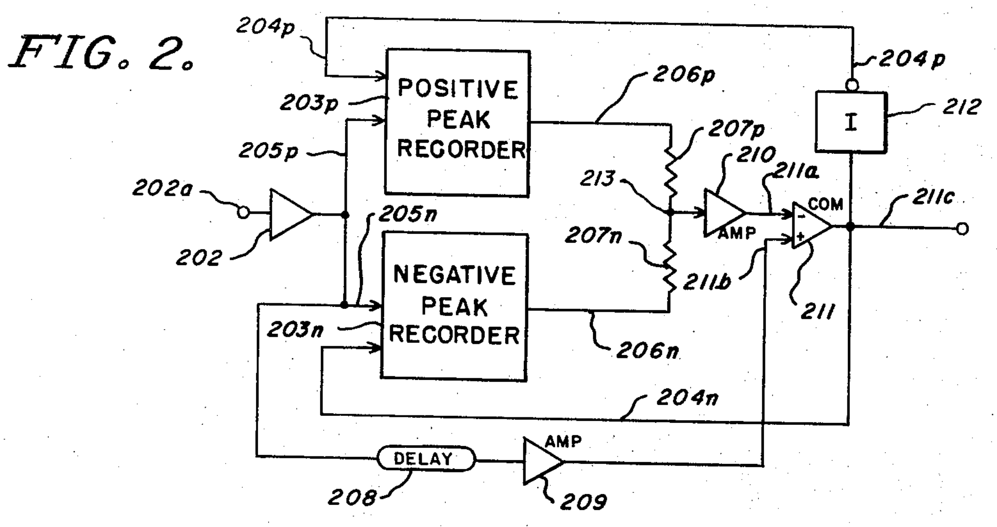
FIG. 2 displays a block diagram of the invention.

The apparatus of our invention, shown in block diagram form in FIG. 2, provides a first order correction for these shifts in transition times in the digitized output. In FIG. 2, the DDS is received at input terminal 202*a* of unity voltage gain amplifier 202, whose output is supplied to DDS inputs 205*p* and 205*n* of positive and negative peak recorders 203*p* and 203*n*, respectively. The outputs of peak recorders 203*p* and 203*n* are supplied on terminals 206*p* and 206*n* to terminals of summing resistors 207*p* and 207*n* are commonly connected to the input of unity voltage gain amplifier 210. The output of amplifier 210 is supplied to minus input terminal 211*a* of comparator 211. The DDS, as amplified by amplifier 201, is supplied to a delay circuit 208 whose output is supplied to unity voltage gain amplifier 209. Amplifier 209 supplies plus input 211*b* to comparator 211. Output 211*c* of comparator 211 is the actual digitized output signal corresponding to the data originally transcribed or transmitted, but delayed by an amount equal to the delay constant of delay circuit 208. The digitized output at terminal 211*c* is transmitted back to reset input 204*n* of peak recorder 203*n* to prepare it for recording the next positive peak. The digitized output at terminal 211*c* is also conducted to inverter 212. The inverted digitized signal from inverter 212 is transmitted to reset terminal 204*p* of peak recorder 203 *p* where it is used to reset the recorder for recording the next positive peak. Depending on the selected embodiment, inverter 212 may supply the digitized signal to the positive peak recorder 203*p* as shown, or to negative peak recorder 203*p*. It is arbitrarily assumed for the purposes of FIG. 2 that the circuit elements chosen will reset the peak recorder responsive to a positive-going transition at the reset terminal.

The operation of the diagram of FIG. 2 starts with amplifier 202 supplying the DDS to peak recorders 203*p* and 203*n* on terminals 205*p* and 205*n* respectively. As each positive peak occurs, peak recorder 203*p* records the voltage of the peak and supplies an output on line 206*p* which is the voltage of this peak. Similarly, line 206*n* provides a voltage equal to the voltage of the most recent negative peak. These two voltages are electrically averaged by resistors 207*p* and 207*n*. In one preferred embodiment, these resistors are of identical ohmages. Therefore, the voltage drop across each is identical, and the voltage at junction 213 is midway between the two recorded peaks. This is strictly true only if the resistance of each is large with respect to the output impedance of the peak recorders. The input impedance of amplifier 210 is ideally large with respect to resistors 207*p* and 207*n*. Therefore, it is desirable to select the ohmages of resistors 207*p* and 207*n* to satisfy this condition. The output of unity voltage gain amplifier 210 is a voltage precisely equal to that at junction 213. Delay circuit 208 delays the DDS by time T. Time T must be selected according to characteristics of the DDS being digitized. (Refer to FIG. 3*b*). Viz., time T must be no longer than the shortest possible time between adjacent, opposite polarity DDS peaks. If it is not, then the delayed DDS may cross the CBS voltage after the earlier of the two peaks has been replaced by the next of the same polarity. T must be at least as long as the maximum time possible between a crossing of the CBS by the delayed DDS and the peak of the delayed DDS immediately following. If this rule is violated, the CBS will not yet be calculated when the delayed DDS reaches the voltage of the CBS for that transition. Of course, the finite response times of the circuit elements involved usually dictate that this ideal interval be shortened. This analysis assumes that delays within amplifiers 209 and 210 cancel each other out. Selecting time T according to this rule will insure that the peaks occurring immediately before and after a crossing of the CBS by the delayed DDS, will have been recorded, averaged, and available to comparator 211 before the delayed DDS actually crosses the CBS.

Comparator 211 provides a low output when plus terminal **211*b* is less positive than minus terminal 211*a*, and a high output when plus input 211*b* is more positive than terminal 211*a*. Thus, when the delayed DDS crosses the CBS in a positive direction, output on line 211*c* changes from low to high. This corresponds to a positive change in write current signal 120.** Accordingly, the next peak to be recorded in the *undelayed* DDS will be a negative peak. Comparator 211 supplies a high signal to peak recorder **203*n* on reset terminal 204*n* causing recorder 203*n* to prepare itself for storing the new negative peak. This preparation is a simple clearing or partial clearing of its storage element. Similarly, the occurrence of a high to low transition in the digitized output on line 211*c* signals positive peak recorder 203*p* through inverter 212** to clear its storage element for the next peak of the undelayed DDS to be recorded, which will be a positive peak. The next peak, positive or negative, in the undelayed DDS cannot have yet occurred because of the restriction of the maximum value of time T.

The theory justifying this correction technique can be best understood by reference again to FIG. 1*b*. It can be seen that the part of readback signal 123 immediately to the left of peak **123*a* has an average slope ($dv/dt$) significantly smaller than that immediately to its right. This is because curves 121 and 122, which superimpose in forming this part of signal 123, overlap only at a leading edge (of curve 121) and a trailing edge (of curve 122). But the leading edge of curve 122′ overlaps peak 121*a*. Thus, the transition between peaks 123*a* and 123*b* takes place in about half the time which a transition of roughly equal magnitude took place on the left hand side of peak 123*a*. The average slope, therefore, in absolute value, is much greater on the right hand side of peak 123*a* than on the left hand side. Because peak 121*a* is overlapped by the leading edge of curve 122′, peak 123*a* of the readback signal is shifted earlier in time. Similarly, peak 123*c* is shifted toward the transition having a smaller absolute slope value. Referring to DDS curve 125,** it can be seen that the value of each of its peaks is a fairly accurate representation of the average slope of the readback signal during the transition occurring at that time. This fact forms an important aspect of our invention.

A few generalizations can be developed from these observations. The less a positive readback signal 121 overlaps a negative readback signal 122, the smaller, in absolute value, will be the slope of the composite readback signal 123 (e.g., left of peak **123*a*). If the next transition of curve 123 is relatively rapid (as it is immediately following peak 123*a*) greater overlap of positive and negative readback pulses occurs, and the peak of signal 123 is shifted correspondingly toward the slower transition. Since peak 123*a* is positive, its leading (left) and trailing (right) edges will have slopes that are, respectively positive (and relatively small in absolute value) and negative (and relatively large in absolute value). The average of the maximum and minimum slopes of these transitions, respectively will be, therefore, negative. Since in the neighborhood of peak 123*a* DDS wave 125 (i.e., slope) is decreasing, the instant it reaches the average value of DDS peaks 125*f* and 125*g* will be later in time than when it became 0. Compensation for the shift in peak 123*a* can be made if this crossing, rather than the 0 crossing, is detected. As the overlap of positive and negative readback signals 121 and 122 becomes greater, the difference between the absolute values of the slopes created thereby becomes greater. The difference between the absolute value of the peaks of DDS waveform 125 corresponding thereto becomes greater and a greater amount of compensation occurs, as is necessary. Similar analyses can also be made for composite readback signal peaks 123*c* and 123*d***. In each case, the amount of compensation depends on the difference between the absolute values of the slope on each side of the peak.

While this is a qualitative, rather than a quantitative analysis, it clearly sets out the justification for the compensation scheme outlined. It would be most accurate to actually compute and use the time-averaged value of the slope during each transition. But this is difficult if not impossible to implement inexpensively, and at present bit densities, is not necessary. At that, even use of average slope would not cause exact correction, since the use of slope at all assumes a linear relationship between change in slope for a change in amount of peak shift. It is therefore only a first order approximation. More accurate analysis would require the determination of the actual shape the individual positive and negative readback signals 122 and 123 are. With this knowledge, a relationship between the shape of an interval of the DDS waveform and the amount a peak is shifted within it can be empirically determined and the compensation be made more precise.

More precision can also be achieved by maintaining a history of previous peak values and using them to modify the value of the two latest peaks. Peak recorders **203*p* and 203*n* may, e.g., form a weighted average of the recent peaks which is transmitted on the output lines 206*p* and 206*n***.

Figure 3A:
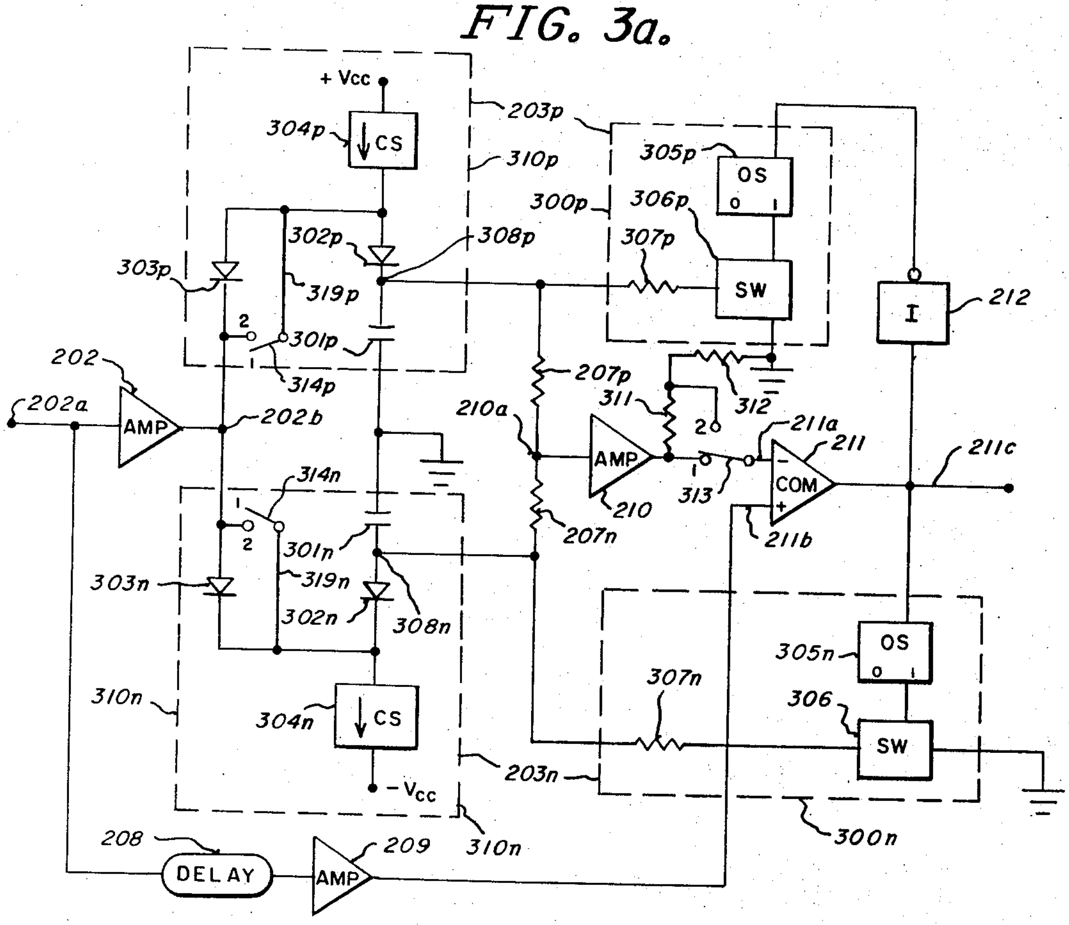

FIG. 3*a* discloses an operational circuit performing the function of the block diagram of FIG. 2. Voltage storing circuit **310*p* and discharge circuit 300*p* form the positive peak recorder 203*p* of FIG. 2. Voltage storing circuit 310*n* and discharge circuit 300*n* comprise negative peak recorder 203*n*. The peak voltages are stored on capacitors 301*p* and 201*n*, each having a neutral terminal grounded. Charging current for capacitor 301*p* is supplied by current source 304*p* through diode 302*p*. Unity gain amplifier 202 receives the DDS on terminal 202*a*, amplifies it, and supplies it to the anode of diode 302*p* through diode 303*p*, whose anodes are commohly connected. Similarly, a negative charge is placed on capacitor 301*n* through diode 302*n* by current source 304*n*. Diode 303*n* connects output 202*b* of amplifier 202 to the cathode of diode 302*n*, the cathodes of the two diodes being commonly connected. Resistors 207*p* and 207*n* each receive on one terminal the voltage stored on capcitors 301*p* and 301*n* respectively. The other terminal of each is connected to input 210 *a* of unity gain amplifier 210. Delay 208 and unity gain amplifier 209 supply the delayed DDS to plus terminal 211*b* of comparator 211. Switch 313 when in position 1, as shown, allows minus terminal 211*a* to receive the output of amplifier 210 directly. When switch 313 is in position 2, the output of amplifier 210 is connected to ground by series resistors 311 and 312, and the CBS, as modified, is available at their common terminal. One-shot 305*p* is set by each change from low to high in its input signal from inverter 212. One-shot 305***p*, when set, provides a high output of its 1 terminal which closes switch 306*p*, establishing a direct ground connection for terminal 308*p* of capacitor 301*p* through discharge resistor 307*p*. Similarly, one-shot 305*n* sets responsive to each change from low to high by the output of comparator 211. While set, its 1 output is high. A high output on the 1 terminal of one-shot 305*n* closes switch 306*n* connecting the ungrounded terminal of capacitor 301*n* to ground through discharge resistor 307*n*. Switches 314*p* and 314*n* when in position 1 as shown illustrate one embodiment of voltage storing circuits 310*p* and 310*n*. When in position 2, a variant on this embodiment is created.

Figure 3B:
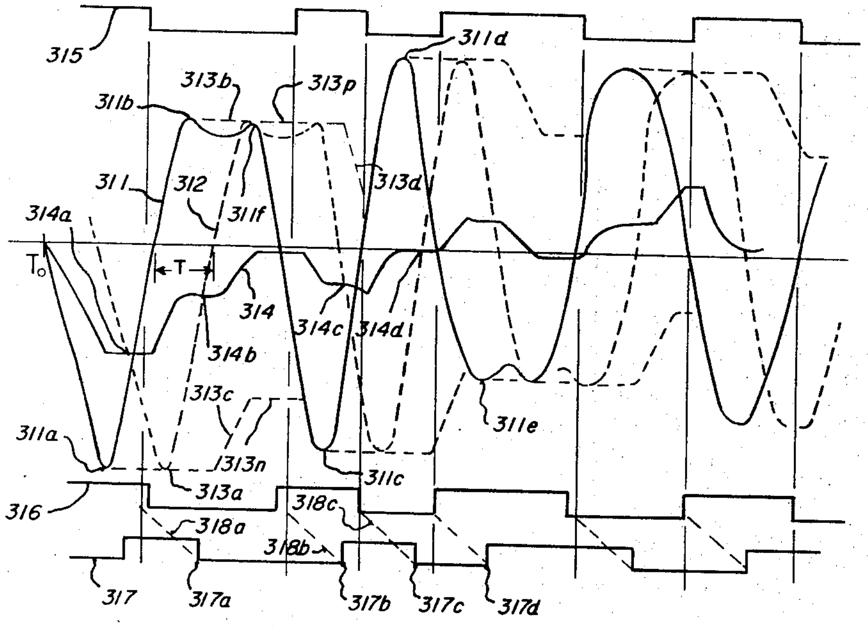

Operation of the circuit of the FIG. 3*a* can be best described by reference to the signal waveforms of FIG. 3*b*. The original write signal is shown as current waveform 315. After transcription or transmission, and subsequent differentiation, signal 315 is represented as voltage waveform 311, and applied to terminal 202*a*. At time $T_o$ assume capacitors 301*p* and 301*n* are completely discharged, one-shots 305*p* and 305*n* are cleared, and switches 313, 314*p* and 314*n* are in the positions shown. As DDS waveform 311 starts swinging down to peak 311*a*, which is negative, voltage at terminal 308*n* will closely follow that at terminal 202*b* because current source 304*n* maintains the cathodes of diodes 302*n* and 303*n* one diode drop below terminal 202*b* by charging capacitor 301*n* to precisely the voltage at terminal 202*b*. To insure this condition, it is only necessary that current source 304*n* have sufficient amperage capacity to charge capacitor 301*n* more rapidly than the fastest negative voltage rate change of which the DDS is capable. When DDS waveform peak 311*a* is reached, voltage at terminal 308*n* will equal this peak. This is shown by the horizontal dotted line portion 313*a* of negative peak recorder waveform 313*n*. The voltage of CBS waveform 314 decreases as DDS waveform 311 decreases toward peak 311*a*, and when peak 311*a* occurs, reaches a minimum value midway between 0 volts and peak 311*a*. As DDS waveform 311 starts to become more positive, its maximum negative voltage will be held on capacitor 301*n* because diode 302*n* prevents discharge of the capacitor. Resistors 207*p* and 207*n* are chosen of sufficient ohmage to prevent appreciable discharge of capacitor 301*n* through them.

Delayed DDS waveform 312 crosses CBS waveform 314 shortly after peak 311*a* is reached. This crossing of CBS waveform 314 has no significance as far as data is concerned because it is necessary to charge both capacitors to peak values of the DDS before the value of the CBS has any meaning. In normal operation of these data recording systems, several bits of information must be written at the beginning of each record for purely timing purposes. Therefore, ample opportunity to precharge the capacitors to their correct voltages normally exists.

DDS waveform 311, after reaching peak 311*a* becomes increasingly positive, reaching positive peak 311*b* after crossing the zero volt datum. After DDS waveform 311 reaches 0 volts, current source 304*p* supplies current to capacitor 301*p* through diode 302*p* so as to maintain voltage on capacitor 301*b* one diode drop below that on the anode of diode 302*p* in the same manner that capacitor 301*n* was charged. When peak 311*b* is reached, voltage across capacitor 301*p* will be precisely equal to it. Diode 302*p* prevents discharge of capacitor 301*p*, so the voltage thereon remains at peak value 311*b* of DDS waveform 311 until discharge occurs by another means, as shown by waveform portion 313*b*. As capacitor 301*p* is being charged, CBS waveform 314 is becoming less negative, finally reaching a constant value adjacent point 314*b* after peak 311*b* is reached. Resistors 207*p* and 207*n* form the CBS as previously explained. At point 314*b* delayed DDS 312 crosses CBS waveform 314. This causes output 211*c* of comparator 211, which was low after point 314*a* of CBS 314, to become high at point 314*b*. Output 211*c* is shown as waveform 317. This is the first digitized data transition at terminal 211*c* which is valid. It is delayed with respect to undelayed DDS waveform 311 by the amount T of delay introduced by delay circuit 208. It is, however, a more accurate transition time in relation to all other transitions of data signal 317. Data signal 316 represents the undelayed transition times if the 0 volt datum is used as the baseline. Diagonal line 318*a* intersects uncompensated digitized signal 316 at the time corresponding to delayed digitized signal time 317*a*, and indicates the amount of time correction realized by detecting crossover of CBS waveform 314 rather than the zero volt datum.

After delayed DDS 312 has crossed CBS 314 at point 314*b*, it is necessary to at least partially discharge capacitor 301*n* to permit its charging to the voltage of next peak 311*c*. The signal transition at terminal 211*c* sets one-shot 305*n* causing its 1 output to become high and supply a closure signal to switch 306*n* . Responsive to this closure signal switch 306*n* closes, connecting resistor 307*n* to ground. Capacitor 301*n* then has a discharge path through resistor 307*n* and switch 306*n* to ground, and its voltage becomes less negative as indicated by the slanted portion 313*c* of voltage wave 313*n*. Capacitor 301*n* continues to discharge until one-shot 305*n* resets as indicated by voltage wave 313*n* becoming horizontal again. The time elapsing between point 314*b* and the start of capacitor 301*n* discharge corresponds to the circuit delay times present in the change in output of comparator 211, setting time of one-shot 305*n*, and closure time of switch 306*n* . The three circuit delay times just mentioned plus the one-shot delay time must be somewhat less than the shortest time possible between a negative DDS peak and when the delayed DDS crosses the CBS. This halts discharge before each negative peak is reached, and allows proper charging of capacitor 301*n*. Resistor 307*n* must be chosen so as to provide a rapid enough discharge of capacitor 301*n* to allow DDS waveform 314 to reach a voltage more positive than the negative peak to be recorded. This in turn is dependent on size of capacitor 301*n*, maximum possible voltage difference between adjacent negative peaks, and minimum possible time between a positive-going crossing of CBS waveform 314 by delayed DDS waveform 312 and the immediately succeeding negative peak of the undelayed DDS. Voltage waveform 313*n* displays this situation in the neighborhood of peak 311*e* where capacitor 301*n* peak receives only a slight charge to bring it to the voltage of peak 311*e*. It is impractical to provide more specific guidelines for the choice of one-shot 305*n* delay time, capacitor 301*n* size and resistor 307*n* until a detailed analysis of the actual DDS to be digitized and the input impedance of amplifier 210 has been made. However, such an analysis is well within the capabilities of those skilled in the art, requiring only the ability to analyze a signal waveform and correlate the interaction between the few circuit and logic elements involved.

As DDS waveform 311 approaches negative peak 311*c*, capacitor 301*n* will be recharged to the voltage of this negative peak. This again changes the voltage of CBS waveform 314 to the voltage shown at crossover point 314*c*. Delayed DDS waveform 312 does in fact cross CBS waveform 314 at point 314*c* while becoming increasingly negative. The output of comparator 211 responsive thereto changes from its high to its low value as indicated by the transition of data signal 317 at point 317*b*. This change causes the output of inverter 212 to change from low to high, setting one-shot 305*p* and closing switch 306*p* for the delay time of one-shot 305*p*. Capacitor 301*p* is discharged and follows waveform position 313*d* during this time although, as can be seen discharge would not have been necessary since positive peak 311*d* is greater than peak 311*b*. since peak 311*d* has the same absolute voltage value that peak 311*c* had, the voltage of CBS waveform 314 is 0 immediately following occurrence of peak 311*d*. This is merely coincidence, but does cause data signal transition 317*c* to exactly coincide with the corresponding transition of uncompensated data signal 316, as shown by diagonal dotted line 318*c*. Considerations for the choice of one-shot 305*p* delay time, capacitor 301*p* value, and resistor 307*p* ohmage are similar to those for discharging capacitor 301*n*. But the delay time of one-shot 305*p* may have to be shortened slightly to take into account the additional signal transfer time through inverter 212, or resistor 307*n* ohmage slightly decreased because of this.

A variant on the voltage recording circuitry is created by closing switches 314*p* and 314*n*, shorting diodes 303*p* and 303*n*. Omission of these diodes causes no loss of accuracy if the lowest possible voltages of both positive and negative peaks of DDS waveform 311 exceed the voltage drop of diodes 302*p* and 302*n*. If such is the case, the net result of using alternate paths 319*p* and 319*n* will be to charge capacitors 301*p* and 301*n* one forward diode voltage drop closer to the zero volt datum shown in FIG. 3*b*. This corresponds to decreasing the absolute values of the positive and negative peaks by equal amounts, leaving the algebraic mean of the two capacitor voltages, and the CBS waveform voltage as well, unaffected at the time delayed DDS 312 crosses it.

A second variant in this circuit may be created by moving switch 313 from position 1 to position 2. When in position 2, the CBS voltage received by comparator 211 is decreased, in absolute value, by a fixed percentage of its unmodified value. These resistors form a simple voltage dropping circuit with the voltage at terminal 2, $V_2$, related to that at terminal 1, $V_1$, by the formula $V_2 = V_1 (R_{311})/(R_{311} + R_{312})$ where $R_{311}$ and $R_{312}$ are the resistances of resistors 311 and 312, respectively. The result of using this modified CBS is to decrease the amount of compensation which occurs at each crossing of the CBS by the delayed DDS. I.e,, each crossing of the modified CBS is between the instant when the delayed DDS crosses the zero voltage datum and the instant when it crosses the unmodified CBS. Experience has shown compensation using the unmodified CBS may overcorrect for those readback signals which have relatively rounded peaks. For these signals, the maximum slope between the peaks of the readback signal (as indicated by the peaks of the DDS) is an inaccurate measure of the time averaged slope between them because the relatively large time of comparatively small slope in the vicinity of each peak destroys this relationship. Use of the voltage divider shown prevents the overcorrection when readback signals with rounded peaks are digitized.

Figure 4A:
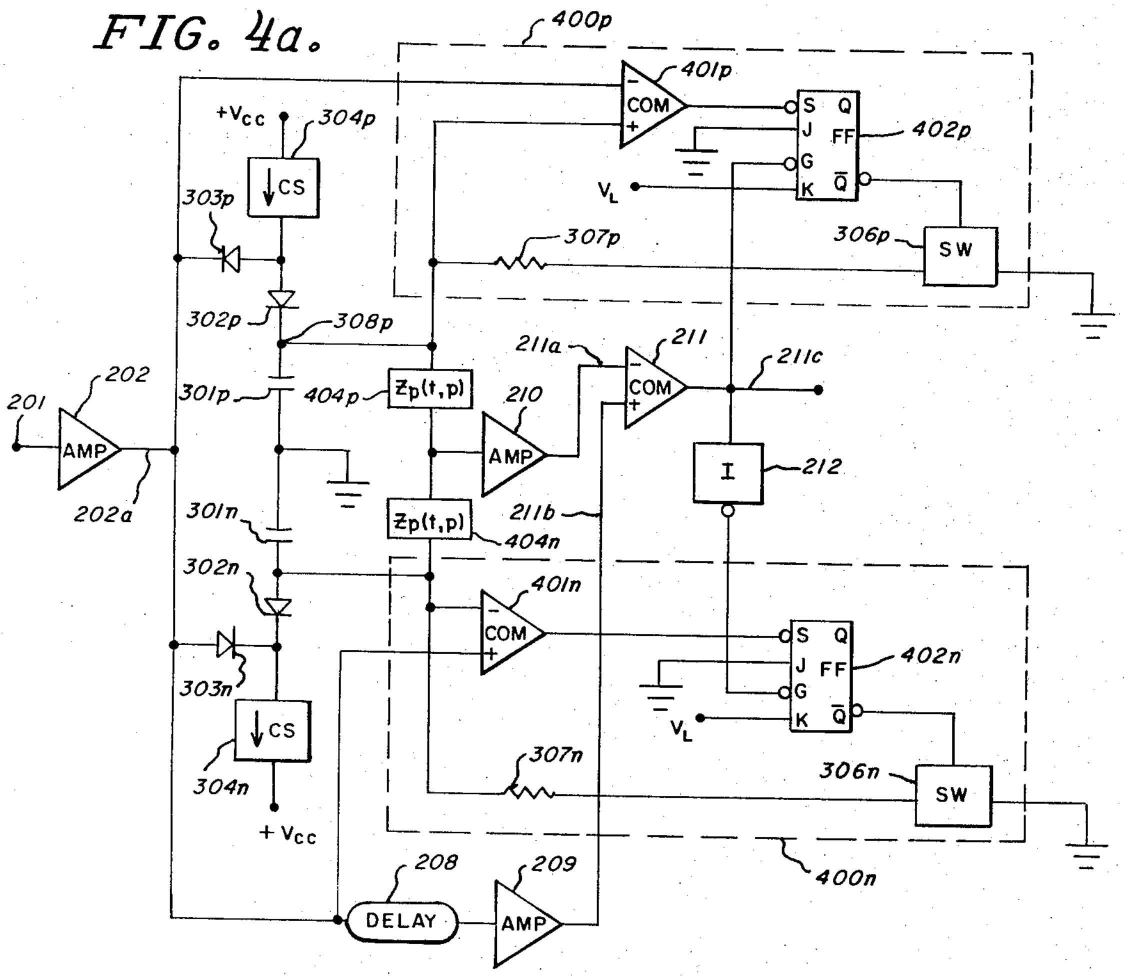

FIG. 4a dislcoses another embodiment of the discharge circuitry and a more general form of the circuitry computing the CBS, with the remainder of the circuit being identical to that disclosed in FIG. 3*a*. This discharge circuitry is enclosed in dashed line boxes 400*p* and 400*n*, performing the functions of, respectively, the circuitry in boxes 300*p* and 300*n* of FIG. 3*a*. The discharge circuitry in FIG. 4*a* for capacitor 301*p* comprises a comparator 401*p* whose minus terminal receives the DDS from output terminal 202*b*. Plus terminal of comparator 401*p* receives the voltage on capacitor 301*p*. The output of comparator 401*p* is connected to the S or SET input of J-K flip-flop 402*p*, and the CLOCK or G input of flip-flop 402*p* receives output 211*c* from comparator 211. J-K flip-flop 402p supplies a control signal to switch 306*p*, similar to the signal supplied by one shot 305*p* in FIG. 3a. J-K flip-flops 402*p* and 402*n* are standard circuits having data inputs on their J and K terminals. As used in the circuit, a logical 0 is permanently placed on each J input and a permanent logical 1 is placed on each K input, as shown by the grounded J terminals, and the logic voltage $V_L$, on the K terminals. Voltage $V_L$ can be easily created by dropping voltage $V_{cc}$ with an appropriate resistor. When thusly connected, the $\overline{Q}$ output of flip-flops 402*p* and 402*n* will set (i.e., each flip-flop will clear) when a logical 1 is present on terminal S and the signal at terminal G changes from 1 to 0, i.e., the input voltage changes from high to low. A logical 0 at the S terminal sets the flip-flop regardless of the CLOCK input. Switch 306*p* is connected to discharge capacitor 301*p* as in FIG. 3*a*. Similarly, the discharge circuitry for capacitor 301*n* in FIG. 4*a* includes comparator 401*n* which receives the voltage of the DDS and capacitor 301 *n* on its plug and minus input terminals, respectively. Output of comparator 401*n* and the inverted output of comparator 211 are connected to the S and G inputs respectively, of J-K flip-flop 402*n*, whose $\overline{Q}$ output is the closure signal to switch 306*n*. Switch 306*n* is connected as in FIG. 3*a*, to discharge capacitor 301*n* through resistor 307*n* when receiving a closure signal.

The computation of the CBS has been changed by replacing resistors 207*p* and 207*n* of FIG. 2, with the generalized impedance units 404*p* and 404*n*. The notation $Z_p$ (t,p) and $Z_n$ (t,p) means that the impedance within each unit is a function of time measured from a convenient datum and of present and past positive and negative peaks. E.g., the peak voltage of very large peaks can be attenuated to prevent overcompensation. If a significant change occurs from one positive peak to the next, the impedance of unit 404*p* can be temporarily changed to prevent over or undercompensation. Many other bases for changing the impedance of units 404*p* and 404*n* may be employed which will be apparent to those skilled in the art. The only limitation is that the modified CBS voltage be between adjacent opposite polarity peaks at the instant that the delayed DDS reaches the peak of the earlier. This insures that the delayed DDS will in fact cross the CBS during the delayed DDS transition between the two peaks.

Figure 4B:
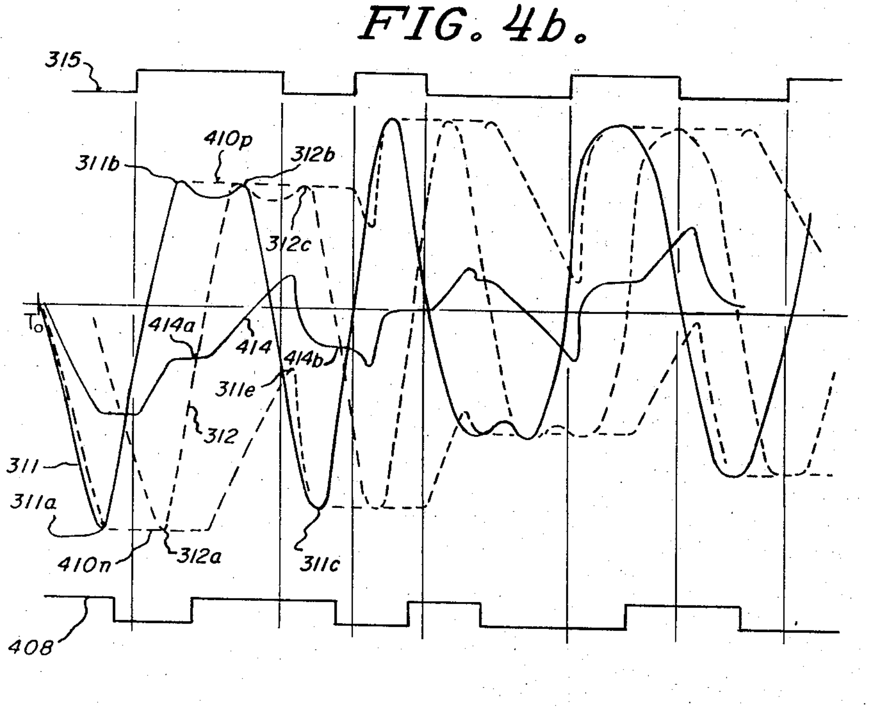

Operation of the embodiment displayed in FIG. 4*a* can be best described in terms of the signal waveforms displayed in FIG. 4*b*. For the purposes of this discussion, assume that units 404*p* and 404*n* comprise fixed identical resistances. Since operation of the voltage recording elements are similar to those in FIG. 3*a*, discussion will center on the discharge circuitry. Starting again at time $T_o$, with capacitors 301*n* and 301*p* both discharged, DDS waveform 311 becomes negative, reaching a peak at point 311*a*. During the time from $T_o$ until point 311*a* is reached, voltage at point 308n will follow DDS waveform 311 and be slightly more positive than it, as shown by waveform 410n. Since the minus input to comparator 401n is slightly more positive than the plus input, output of comparator 401*n* will be low (logical 0) and flip-flop 402*n* will be set, with the $\overline{Q}$ output low. Thus, switch 306*n* is open and capacitor 301n can charge up to the voltage at peak 311*a*. When this voltage is reached, as with the circuit of FIG. 3*a*, CBS waveform 414 will be exactly midway between the 0 volt datum and the voltage across capacitor 301*n*. DDS waveform 311 then swings positive reaching peak 311*b*. At the very beginning of this transition, the DDS crosses the voltage on capacitor 301*n* causing comparator 501*n* to supply a high input to the J-K flip-flop 402*n* S terminal. When DDS waveform 311*b* becomes slightly positive, thereby exceeding the 0 volts on capacitor 301*p*, the minus input terminal of comparator 401*p* becomes more positive than the voltage at the plus terminal. The output of comparator 401*p* then becomes low, causing flip-flop 402*p* to set and open switch 306*p* if not already open. The output of comparator 401*p* remains low until peak 311*b* is reached. Immediately after peak 311*b* occurs, DDS waveform 311 becomes less positive than the voltage on capacitor 301p, and the input to the S terminal of flip-flop 402*p* becomes high. Just after peak 311*b* is reached, CBS waveform 414 accurately represents the voltage necessary to correctly determine the original transition time, as delayed, of write current waveform 315. After peak 311*b* is reached, but well before peak 311*c*, CBS waveform 414 is crossed by delayed DDS waveform 312 in the positive direction at point 414*a*. This causes output 211*c* to change from low to high. As previously explained, the S input of flip-flop 402*n* is already high because the voltage of undelayed DDS waveform 311 is more positive than the voltage on capacitor 301*n*. Therefore, the change in output of comparator 211 causes the output of inverter 212 to change from high to low and flip-flop 402*n* to clear, closing switch 306*n* to discharge capacitor 301*n*. Capacitor 301*n* continues to discharge until its voltage becomes more positive than that of undelayed DDS waveform 311, which occurs at point 311*e*. This causes the output of comparator 401*n* to swing low, and flip-flop 402n to set, and change its $\overline{Q}$ output to a logical 0 again, opening switch 306*n*. Capacitor 301*n* then charges to the voltage at peak 311*c*. Shortly thereafter, delayed DDS waveform 312 crosses this new CBS waveform voltage at point 414*b*, changing the output of comparator 211 from high to low. The output of comparator 401*p*, it can be remembered, is a logical 1 because the voltage on capacitor 301p is greater than the voltage of DDS waveform 311 and therefore the S input to flip-flop 402*p* is high. The transition from high to low of output 211c clears flip-flop 402*p* causing its $\overline{Q}$ output to become high and close switch 306*p*, starting discharge of capacitor 301*p*. Capacitor 301*p* continues to discharge until its voltage becomes less positive than that of DDS waveform 311, whereupon flip-flop 402*p* is again set, causing its $\overline{Q}$ output to become low again and open switch 306*p*. This pattern continues with flip-flops 402*p* and 402*n* alternately setting and clearing and allowing their associated peak storing capacitors to charge and discharge, thereby furnishing a CBS to comparator 211 having voltage causing the transitions of output signal 211*c* to correspond to those of write current waveform 315.

Figures 5A, 5B:
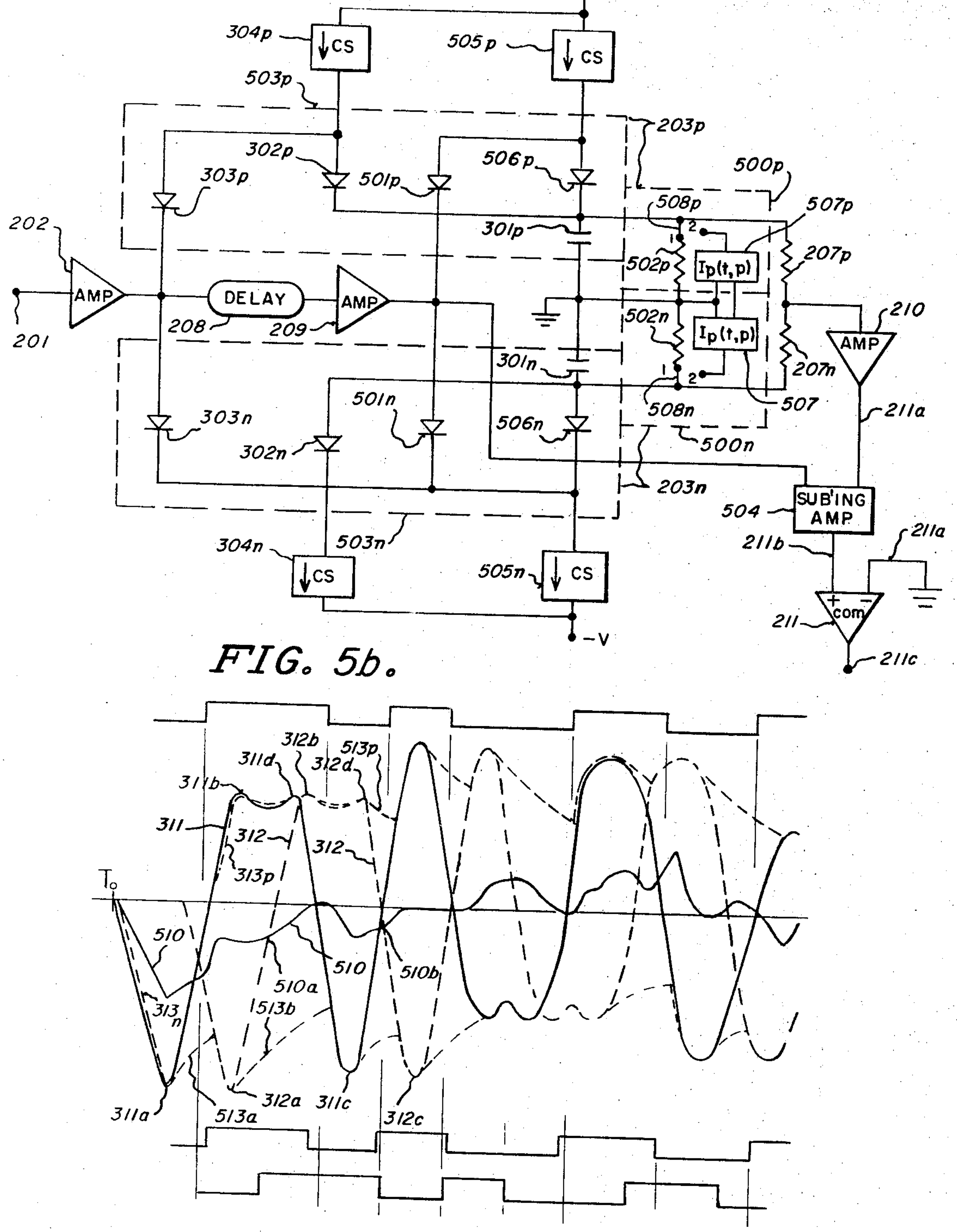

FIG. 5*a* displays yet a third peak recorder circuit wherein the discharge occurs continually through discharge resistors 502*p* and 502*n* or current regulator discharge units 507*p* and 507*n*, depending on the position of switches 508*p* and 508*n*. The labels $I_p$ (*t,p*) and $I_n$ (*t,p*) imply that current flow I can change as a function of time and present and past peak voltages. One preferred alternative discharge circuit is a fixed resistance path between the signal terminals of capacitors 301*p* and 301*n*. In this case, summing resistors 207p and 207n may be in effect combined with the discharge resistors by disconnecting switches 508*p* and 508*n* from both their 1 and 2 terminals, and selecting the resistance of resistors 207*p* and 207*n* small enough to provide the desired continual discharge. Of course, the resistance of resistors 207*p* and 207*n* need not be equal. This provides for a type of exponential decay of the capacitor voltages. Constant current discharge may also be used to cause the voltages to decay linearly with time, an advantage if the arithmetic mean, or a weighted average of the peaks form the CBS. Discharge units 507*p* and 507*n* can also be provided with memories which record previous peaks and adjust decay rate as a function of these values.

For the purpose of explaining the operation of this circuit, assume that switches 508*p* and 508*n* are in position 1 as shown. Peak storage circuits 503*p and 503n* are similar to peak storage circuits 310*p* and 310*n* of FIG. 3*a*. Circuit 503*p* has been changed by adding diodes 501*p* and 506*p* to circuit 310*p*. The anode and cathode of diode 506*p* are connected to the ungrounded terminal of capacitor 301*p* and the output terminal of current source 505*p* respectively. The cathode of diode 510*p* is connected to the output of amplifier 209, and the anode is connected to the anode of diode 302*n*. A similar second charging circuit for capacitor 301*n* is provided by diodes 501*n* and 506*n* which have their respective anodes connected to the output of amplifier 209 and the ungrounded plate of capacitor 301*n* and their cathodes to output terminal of current source 505*n*. This second charging circuit is optional, depending on the regulation of capacitor discharge by units 507*p* and 507*n*. The digitizer in this circuit is preceded by a subtracting amplifier 504 receiving the DDS and continually subtracting from it the CBS, forming the instantaneous difference of their respective voltages, and supplying this to plus input 211*b* of differential comparator 211.

At time $T_o$ assume that capacitor 301*p* and 301*n* are completely discharged, and that DDS waveform 311 is at 0 volts as shown in FIG. 5*b*. As waveform 311 swings negative, capacitor 301*n* will start charging in the negative direction, reaching the peak negative voltage of DDS waveform 311 at point 311*a*. Charging to this peak is controlled by voltage at the cathode of diode 303n. As DDS waveform 311 starts swinging positive, diode 302n prevents discharge of capacitor 301n into current source 304n. However, discharge resistor 502n allows capacitor 301n to discharge at a decreasing rate, as shown by capacitor voltage waveform portion 513a. During this discharge time, CBS waveform 510 which had reached a negative minimum when peak 311 occurred, now becomes increasingly positive and is crossed by delayed DDS waveform 312. This crossing is of no significance, because no positive peak voltage is stored on capacitor 301n. When DDS waveform 311 crosses the 0 volt datum, charging of capacitor 301p commences. Capacitor 301p is charged to a maximum at peak 311b. At the same time, delayed DDS waveform 312 is reaching negative peak 312a, which corresponds to undelayed DDS waveform peak 311a. Because of the voltage at the cathode of diode 501n, capacitor 301n is recharged to the voltage of negative peak 311a, diode 506n preventing later discharge of capacitor 301n in this case. Delay 208 should be chosen to have a time constant approximately equaling the shortest transition time between any two adjacent opposite polarity peaks of DDS waveform 311. By imposing this condition, peak 312a of delayed DDS waveform 312 is reached at approximately the time undelayed DDS peak 311b occurs. Thus, both capacitor 301p and capacitor 301n are charged to their maximum voltage at approximately the same time. Both will, therefore, have discharged for approximately equal lengths of time when delayed DDS waveform 312 crosses CBS waveform 510 at point 510a. Because the voltage at peak 311b is less positive than the voltage at points 311a and 312a is negative, each capacitor will have discharged a different voltage amount when point 510a is reached, and, therefore, CBS waveform 510 at point 510a will be slightly more positive than the actual algebraic mean of the voltage at peaks 311a and 311b. It has been found however, that this error is within acceptable limits for a large number of digitizing operations, as can be seen by the only slight increase in CBS waveform 510 voltage in the neighborhood immediately to the left of point 510a. After peak 311b, DDS waveform 311 continues at approximately the same level for a period of time, and then starts swinging toward negative peak 311c. During this time, discharge resistor 502n has been discharging capacitor 301n as shown by capacitor voltage segment 513b. When capacitor voltage waveform portion 513b meets DDs waveform 311 as it swings toward peak 311c, capacitor 310n voltage starts decreasing with it and eventually reaches the voltage of peak 311c. Simultaneously, capacitor 310p is being recharged by delayed DDS waveform 312, presented to it by diode 501p, and is charged to the voltage of peak 311d (peak 312d) just prior to the crossing of CBS waveform 510 at point 510b by delayed DDS waveform 312 as it swings negative toward peak 312c. Again, capacitors 301p and 301n are discharged toward the 0 volt datum at slightly different rates, but not by an extent so great as to cause the error in CBS waveform 510 to become intolerable.

The great advantage of this embodiment is simplicity and inexpensiveness. Whereas the two earlier embodiments required logic elements, each containing several active components, this circuit replaces all those elements with a pair of diodes. For this reason, we have found that this circuit is to be preferred over the two preceding for a wide range of applications. Furthermore, by moving switches 508p and 508n to position 2, different discharge rates may in effect be substituted for that through resistors 502p and 502n by proper choice of current regulator units 507p and 507n.

A slight variation in the means of digitizing the DDS is further shown in FIG. 5*a*. The CBS is instantaneously and continually subtracted from the delayed DDS by subtracting amplifier 504, producing a compensated delayed DDS. This signal is compared to the zero volt datum as shown (or to any other reference voltage) by comparator 211, and each crossing of it by the compensated delayed DDS causes output 211c to change state at exactly the same time as if the CBS is compared with the delayed DDS. In general, this is not as useful a means of digitizing as the simpler circuits of FIGS. 3*a* and 4*a* because of the extra delay within subtracting amplifier 504 and the additional expense involved. In certain applications, however, it may have advantages.

This invention relates broadly to all sorts of compensation schemes employing the shape of the differentiated readback signal as a basis for forming a correction for peak shift caused by signal overlap. Thus, in the circuit of FIG. 5*a*, the peaks immediately preceding and succeeding the DDS transition are not always used to form the DDS. In FIG. 5*b*, the transition at point 510b may be dependent on either peak 312b or 312d (peak 311b or 311d) depending upon their relative magnitudes. The skilled designer may possibly be capable of sophisticated improvements upon our basic idea which will provide greater reliability in readback signals subject to extreme pulse crowding. Accordingly, we do not wish to be limited in the scope of our invention by the specific circuits and teachings herein present, but only by the following claims.

We claim:

1. Apparatus receiving the differential of a data signal subject to peak shift errors caused by pulse crowding, and supplying a compensated baseline signal useful in extracting the data content of the differentiated data signal, comprising means for recording the value of at least one positive peak and one negative peak of the differentiated data signal and means for producing a compensated baseline signal with a value dependent upon the recorded values of the positive and negative peaks of the differentiated data signal and falling between a pair of adjacent opposite polarity peaks.

2. The apparatus of claim 1 wherein the compensated baseline signal producing means comprises means for supplying a compensated baseline signal following the algebraic mean value of a positive peak and a negative peak of the differentiated data signal.

3. The apparatus of claim 1 wherein the baseline signal generator comprises a signal mean generator supplying a compensated baseline signal encoding the value of the algebraic mean of a positive peak and a negative peak of the differentiated data signal.

4. The apparatus of claim 1 wherein the baseline signal generator comprises a signal mean generator supplying a compensated baseline signal encoding the value of the algebraic mean of a positive peak and adjacent negative peak of the differentiated data signal.

5. The apparatus of claim 4, further comprising means for producing a modified compensated baseline signal falling between the compensated baseline signal and ground.

6. The apparatus of claim 5 wherein the compensated baseline signal modifying means comprises a pair of series-connected impedances connecting the compensated baseline signal to ground and supplying the modified signal at their connection point.

7. The apparatus of claim 6 wherein each impedance comprises a resistor.

8. The apparatus of claim 1 further comprising a positive peak recorder storing the value of a positive peak of the differentiated data signal, and a negative peak recorder storing the value of a negative peak of the differentiated data signal.

9. The apparatus of claim 8 wherein each peak recorder further comprises a capacitor, means for charging the capacitor to the peak differentiated data signal value to be recorded, and means for preventing discharge of the capacitor at greater than a predetermined rate until after the differentiated data signal has crossed the compensated baseline signal in a predetermined direction.

10. The apparatus of claim 9 wherein the charging means and discharge preventing means in combination comprise a first diode connecting the differentiated data signal source to the capacitor and driven into conduction by a differentiated data signal peak of the polarity to be stored on the capactior.

11. The apparatus of claim 10, wherein each peak recorder further comprises a current source supplying current of polarity similar to the differentiated data signal peaks to be stored on the capacitor, to the diode terminal connected to the differentiated data signal source.

12. The apparatus of claim 11, wherein each peak recorder further comprises a second diode connecting the differentiated data signal source to the junction of the current source and the first diode, which like diode terminals connected.

13. The apparatus of claim 9, wherein each peak recorder further comprises means for discharging the capacitor to reach a predetermined level after the differentiated data signal has crossed the compensated baseline signal in a predetermined direction.

14. The apparatus of claim 13 wherein each discharging means comprises a variable impedance connected across the capacitor terminals and entering a low impedance state responsive to the differentiated data signal crossing the compensated baseline signal in a predetermined direction.

15. The apparatus of claim 14 wherein the discharging means further comprises means for placing the variable impedance in a high impedance state a predetermined time after entering the low impedance state.

16. The apparatus of claim 14 wherein the discharging means further comprises a one-shot supplying a closure signal responsive to the second crossing of the compensated baseline signal following the previous issuance of the closure signal, and wherein the variable impedance comprises a switch closing responsive to the closure signal.

17. The apparatus of calim 14 further comprising a differential comparator receiving the differentiated data signal and the compensated baseline signal and supplying an output signal having first and second states when the differentiated data signal is, respectively lesser and greater than the compensated baseline.

18. The apparatus of claim 17 wherein each variable impedance comprises a switch closing responsive to a closure signal; and a one-shot setting responsive to the changes in the differential comparator output causes by the differentiated data signal moving toward the peak stored by the recorder of which the one-shot is an element, and supplying a closure signal to the switch while set.

19. The apparatus of claim 14 further comprising a delay receiving the differentiated data signal and supplying the differentiated data signal delayed sufficiently to cause the delayed signal transition between two adjacent recorded peaks to cross the compensated baseline signal computed from them before the occurrence of the peak in the undelayed differentiated data signal following the later of the recorded peaks.

20. The apparatus of claim 19 wherein each variable impedance includes means for causing it to enter its high and low impedance states responsive to, respectively, first and second states of a closure signal and wherein each discharging means further comprises a logic element supplying the second state of the closure signal responsive to the delayed differentiated data signal crossing the baseline signal in the direction away from the peak stored in the associated capacitor and while the undelayed differentiated data signal is between the voltages on the capacitors, and the fifst state otherwise.

21. The apparatus of claim 19 further comprising a first comparator receiving the compensated baseline signal and the delayed differentiated data signal and supplying an output signal having first and second states respectively as the delayed differentiated data signal voltage is less than more positive than the baseline signal voltage; a second comparator receiving the undelayed differentiated data signal and the voltage across the capacitor storing the positive peaks and supplying an output signal having first and second states respectively as the capacitor voltage is less and more positive than the undelayed differentiated data signal; a third comparator receiving the undelayed differentiated data signal and the voltage across the capacitor storing the negative peaks and supplying an output signal having first and second states respectively as the capacitor voltage is less and more positive than the undelayed differentiated data signal; and wherein the variable impedance discharging the positive peak storing capacitor further comprises a first normally open switch element which is connected across the capacitor terminals, which receives the output of the first and second comparators, which closes responsive to the output of the first comparator changing from its second to its first state and which is open while the output of the second comparator is in its first state; and the variable impedance discharging the negative peak storing capacitor further comprises a second switch element which is connected across the capacitor terminals, which receives the output of the first and third comparators, which closes responsive to the output of the first comparator changing from its first to its second state and which is open while the output of the third comparator is in its second state.

22. The apparatus of claim 13 wherein each discharging means comprises a resistor connected across the corresponding capacitor.

23. The apparatus of claim 13 wherein each discharging means comprises a resistor connected across the corresponding capacitor and having a value allowing the capacitor to discharge to within a predetermined value of the lowest possible peak of the polarity stored by the capacitor.

24. The apparatus of claim 13 further comprising a delay circuit delaying the differentiated data signal by a predetermined amount, means for charging each capacitor to each delayed DDS peak of the polarity stored by it, as each peak occurs; and wherein each discharging means comprises a resistor connected across the corresponding capacitor.

25. The apparatus of claim 13 wherein each discharging means comprises an impedance connected across the corresponding capacitor; and further comprising a delay circuit delaying the differentiated data signal by an interval substantially equal to the shortest time between any of its successive DDS peaks of opposite polarity, and means for charging each capacitor to the delayed differentiated data signal peak of the polarity stored by the capacitor.

26. The apparatus of claim 25 wherein the means for charging each capacitor to the delayed differentiated data signal peak comprises a diode connecting the delayed differentiated data signal to a capacitor and being forward biased by the occurrence of a delayed differentiated data signal peak of the polarity stored by the capacitor.

27. The apparatus of claim 26 further comprising a second diode and a current source associated with each peak recorder, the current source supplying current of polarity similar to the differentiated data signal peaks stored on the capacitor to the capacitor through the second diode to charge the capacitor to the peak of the delayed differentiated data signal and prevent capacitor discharge through the second diode.

28. The apparatus of claim 9 wherein a peak recorder further comprises means for maintaining constant current discharge of the capacitor therein sufficient to discharge the capacitor to within a predetermined voltage range prior to the occurence of each successive peak.

29. The apparatus of claim 9 further comprising an impedance discharging the positive peak storing capacitor into the negative peak storing capacitor at a rate sufficient to discharge the capacitors to within a predetermined voltage range prior to the occurrence of each successive peak.

30. The apparatus of claim 9 further comprising a constant discharge current regulator discharging the positive peak storing capacitor into the negative peak storing capacitor at a rate sufficient to discharge the capacitor to within a predetermined voltage range prior to the occurrence of each successive peak.

31. The apparatus of claim 9 further comprising a pair of impedances connected to provide a series path to discharge the positive peak storing capacitor into the negative peak storing capacitor at a rate sufficient to discharge the capacitors to within predetermined voltage ranges prior to each successive peak, and to supply the compensated baseline signal at the junction of the two impedances.

32. The apparatus of claim 31 wherein at least one impedance comprises a resistor.

33. The apparatus of claim 8 further comprising first and second impedances each having first and second terminals and each receiving at their first terminals respectively, the values recorded by the positive and negative peak recorders, and having their second terminals commonly connected and supplying thereat the compensated baseline signal.

34. The apparatus of claim 33 wherein at least one of the first and second impedances comprise a resistor.

35. The apparatus of claim 33 wherein the two impedances comprise equal-valued resistors.

36. The method of correcting the peak shift errors caused by pulse crowding in a differentiated data signal, when extracting the data therefrom, comprising the steps of:

a. recording a plurality of positive peaks of the differentiated data signal;
b. recording a plurality of negative peaks of the differentiated data signal;
c. producing a compensated baseline signal dependent on the value of adjacent recorded peaks of opposite polarity;
d. delaying the differentiated data signal in amount less than the shortest interval between successive peaks; and
e. producing an output signal which changes state whenever the value of the delayed differentiated data signal crosses the compensated baseline signal.

37. The method of claim 36, wherein the peak recording steps further comprise the steps of recording every positive and every negative peak value, and the differentiated data signal delaying step further comprises delaying the differentiated data signal until the transition between adjacent peaks of opposite polarity starts within a predetermined time of occurrence of the earlier of the two adjacent peaks.

38. The method of claim 36 wherein the step of producing a compensated baseline signal further comprises the step of forming a signal following the algebraic mean of the adjacent recorded peaks.

39. Apparatus for digitizing a pulse-crowded data signal after differentiation of the data signal, comprising:

a. a compensated baseline signal generator receiving the differentiated data signal and supplying a compensated baseline signal encoding a value between a first positive peak and an adjacent first negative peak of the differentiated data signal;
b. means for delaying the differentiated data signal a time sufficient to permit the differentiated data signal transition between the first positive and first negative peaks to cross the compensated baseline signal; and
c. a digitizer receiving the delayed differentiated data signal and the compensated baseline signal and generating the digitizer output signal and generating the digitizer output signal therefrom.

40. The apparatus of claim 39 wherein the delay means further comprises a signal delay receiving the differentiated data signal and supplying this signal delayed by a time no longer than the shortest interval between adjacent, opposite polarity peaks of the differentiated data signal, and no shorter than the maximum interval between the occurrence of a first peak of the differentiated data signal and the instant when the differentiated data signal crosses the compensated baseline signal between the first peak and the opposite polarity peak immediately following the first peak.

41. The apparatus of claim 39 wherein the compensated baseline signal generator comprises means for providing a compensated baseline signal varying as a function of at least another peak of the differentiated data signal in addition to said first positive and negative peak.

42. The apparatus of claim 39 wherein the digitizer comprises:

a. means for receiving the delayed differentiated data and the compensated baseline signals for supplying a compensated delayed differential data signal following the difference of the voltages of the delayed differentiated data and the compensated baseline signals;

b. a reference voltage source; and c. a differential comparator receiving the compensated delayed differentiated data signal and the reference voltage, and supplying an output signal having first and second states when the compensated delayed differentiated data signal is respectively lesser and greater than the reference voltage.

43. The apparatus of claim 42 wherein the summing means comprises a voltage subtractor supplying an output whose instantaneous voltage equals the difference of the instantaneous voltage of the compensated baseline signal subtracted from that of the delayed differentiated data signal and wherein the reference voltage input of the comparator is grounded.

44. The apparatus of claim 39 including a delay receiving the differentiated data signal and supplying this signal delayed by an interval no longer than the shortest interval between adjacent opposite polarity peaks.

* * * * *